No. 609,934. Patented Aug. 30, 1898.
A. HEUSCH.
TWINE HOLDER.
(Application filed Dec. 4, 1897.)

(No Model.)

Witnesses:
Wm. E. Van Inwegen.
W. L. Wright.

Inventor
Anton Heusch.
By Wm. Zimmerman.
Atty

UNITED STATES PATENT OFFICE.

ANTON HEUSCH, OF CHICAGO, ILLINOIS, ASSIGNOR OF ONE-HALF TO WILLIAM ZIMMERMAN, OF SAME PLACE.

TWINE-HOLDER.

SPECIFICATION forming part of Letters Patent No. 609,934, dated August 30, 1898.

Application filed December 4, 1897. Serial No. 660,811. (No model.)

*To all whom it may concern:*

Be it known that I, ANTON HEUSCH, a citizen of the United States, residing at Chicago, in the county of Cook and State of Illinois, have invented certain new and useful Improvements in Twine-Holders, which are fully set forth in the following specification, reference being had to the accompanying drawings, forming a part hereof, and in which—

Figure 2:
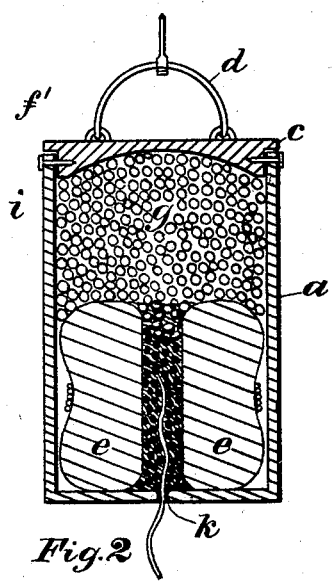
Figure 1:
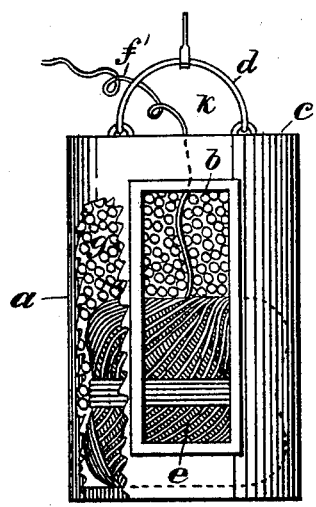
Figure 3:
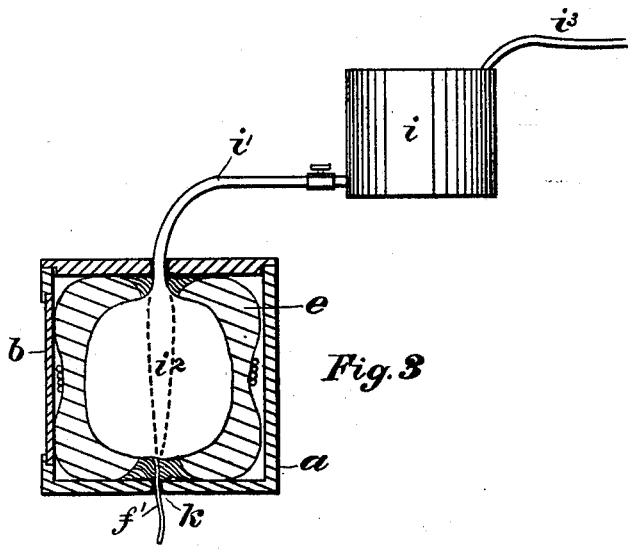

Figure 1 shows my new twine-holder in perspective with part broken away to show the interior mechanism charged and ready for use. Fig. 2 shows a vertical central section of my twine-holder charged and ready for operation. Fig. 3 shows the said device in a charged condition in modified form with twine-holder in central vertical section.

Like letters of reference denote like parts.

The object of my invention is to produce a twine-holder which shall prevent the collapsing of any part of the ball of twine as it becomes used up from its interior, my invention applying only to that kind of unwinding of twine, and thereby prevent the knotting and consequent loss of such remaining part; also, at the same time show the quantity of twine left and prevent other unpleasant annoyances in the use of such twine, whether in reapers, in merchant-stores, or wherever it may be used.

To attain said desirable ends, I construct my said new twine-holder in substantially the following manner, namely: I make a twine-holder $a$, consisting of a vessel or holder of any desired form and material, and connect thereto a chamber or reservoir $i$, either as a part of said holder, consisting, preferably, of an upper part of said vessel, as shown in Figs. 1 and 2, or as a separate structure, as shown in Fig. 3. Said holder is filled with any suitable material that will under suitable conditions flow under the action of gravity. In Figs. 1 and 2 grains $g$—such as peas, corn, wheat, or dry sand and the like—are indicated. In Fig. 3 is shown a way in which fluid substances are applied to attain the same end, the reservoir or chamber $i$ in said latter case being a separate vessel which is extended by means of a pipe $i'$, with a collapsible vessel—as a bladder, for instance—at its outer end, though not necessarily so constructed, as the reservoirs shown in Figs. 1 and 2 are perfectly well adapted to serve the same end. Said vessel is placed into the central space made in the balls of twine it is proposed to use, and the fluid, air, water, &c., allowed to fill the expansible part of the holder $i^2$. In the use of any of said fluids the reservoir may serve as a pipe, as $i^3$, the part $i^2$ being merely an expansible part of it, and derive its supply of fluid from any source—as, for instance, when such a tube is filled with water and supported high enough to cause the water to flow into the expansible end with the necessary weight or force.

The use of fluids may, however, be made quite as readily in the constructions shown in Figs. 1 and 2, as one end of the holder $i^2$ may be compressed to enter the hole in the twine ball, while its remaining portion rests on top of the ball in the chamber $i$, from which latter place its fluid fills the void as rapidly as made by the outgoing twine. The principle of construction and operation in all cases remains the same; but when fluids are used they are held in a flexible skin set on top of the twine ball, but whereof a part of said skin is placed within the hollow part of the twine ball and into which the fluid passes and expands said skin in proportion as the outgoing twine increases the interior space of the twine ball.

A window $b$, extending from the upper part of the reservoir $i$ to below the middle of the holder $a$, shows the operation and condition of the parts within the said parts.

The apparatus being constructed and charged as shown is ready for use. When twine is now drawn from the holder through either opening $k$, the void thus made by the outgoing twine is filled with said flowing material as fast as the void is being formed, whatever said flowing material may be, and as the constantly-outgoing string enlarges the void following its outgo that void is as promptly filled as made, and thus the shell of twine, constantly growing thinner and more and more liable to collapse, is supported by the inflowing filling material and held in its original position to its end in every part.

The material which fills said constantly-forming void also serves another essential function—namely, as a check or brake to the outgoing string, said brake having just enough force to prevent the outgoing twine from running out without being forced to do so. Finally, by means of the window the condition of things within the structure becomes discernible at a glance. At the beginning the grains $g$ are on top of the ball of twine. As the ball runs out the grains descend, until when near the end of the twine the last grains have entered the ball and are exhausted from their reservoir. The collapsible reservoir shows by its fullness at its top on the top of the ball of twine and also through the last strands of the twine about how near the ball of twine is exhausted. Said last condition is also as clearly seen when grains are used and is a valuable help in the use of twine-binders as well as in all other places of use.

What I claim is—

1. The combination with a twine-holder provided with a twine-outlet and a ball of twine, of a reservoir connected to said twine-holder, and a material therein adapted to pass, by active force, into the void made by the outgoing twine and, interiorly hold the twine ball from collapsing, substantially as specified.

2. The combination with a twine-holder provided with a twine-outlet and a ball of twine, of a reservoir connected to said twine-holder and a material therein adapted to pass, by active force, and progressively fill the void made by the outgoing twine and means to make known the amount of expended and unexpended twine, substantially as specified.

ANTON HEUSCH.

Witnesses:
FRANKLIN P. BURKHARDT,
WM. ZIMMERMAN.